United States Patent [19]

Kramer

[11] Patent Number: 5,462,427
[45] Date of Patent: Oct. 31, 1995

[54] ROTARY TABLET PRESS

[75] Inventor: Hans Kramer, Köln, Germany

[73] Assignee: Kilian & Co. GmbH, Cologne, Germany

[21] Appl. No.: 231,070

[22] Filed: Apr. 22, 1994

[30] Foreign Application Priority Data

May 5, 1993 [DE] Germany .................. 9306785 U

[51] Int. Cl.⁶ .................................. B30B 11/08
[52] U.S. Cl. .................. 425/231; 425/345; 425/348 R; 425/353
[58] Field of Search ............... 425/231, 345, 425/347, 348 R, 352, 353, 354, 355

[56] References Cited

U.S. PATENT DOCUMENTS

| | | | |
|---|---|---|---|
| 3,533,360 | 10/1970 | Kibbe | 425/231 |
| 4,259,049 | 3/1981 | Willich | 425/353 |
| 4,408,975 | 10/1983 | Hack | 425/231 |
| 4,569,650 | 2/1986 | Kramer | 425/354 |
| 4,793,791 | 12/1988 | Kokuryo | 425/348 R |

FOREIGN PATENT DOCUMENTS 3049597 7/1982 Germany .

*Primary Examiner*—Jay H. Woo
*Assistant Examiner*—Joseph Leyson
*Attorney, Agent, or Firm*—Vickers, Daniels & Young

[57] ABSTRACT

A rotary tablet press has upper rams (18) and lower rams (19) which are sealed off from the mould shelf (15) of the press by respective intermediate walls (28) in which all the rams (18,19 respectively) are clamped at their head ends to the free ends of individual sleeves (45), with the other ends of these sleeves being secured to the edges (44) of circular apertures (43) formed in the intermediate walls. These circular apertures (43) surrounding the ram shanks (20) with a spacing, so that the intermediate walls (28) are not stretched when the rams (18 and 19) carry out upward and downward movements.

8 Claims, 2 Drawing Sheets

1

ROTARY TABLET PRESS

FIELD OF THE INVENTION

The invention relates to a rotary pelleting machine or tablet press, more particularly to a press having a rotatable mould table and pairs of upper and lower rams which are co-axially movable to and fro with respect to the mould table.

BACKGROUND OF THE INVENTION

It is known that a rotary tablet press has pairs of upper and lower rams arranged around a rotatable mould table, and all the upper rams and all the lower rams are secured in an airtight manner to respective flexible annular intermediate walls which cover the ram shanks. These intermediate walls are secured in an airtight manner at least with its inner edge to the mould table and situated between the mould table and the upper ram guides or lower ram guides respectively.

In order to keep away from the ram shanks the mouldable material powder or dust which whirls about during the operation of the rotary tablet presses, it is known (DE-PS 30 49 597) to arrange between the mould shelf and the ram guides in the mould table an annular sealing wall which is secured with its edges on the mould table and has holes arranged in a circle in which the ram shanks sit. As a result only the moulding heads of the rams, which heads enter into the moulds, are in the dust-filled region above and below the mould shelf, whereas the ram shanks, moving upwards and downwards in their slide guides in the mould table, are shielded by the flexible walls and substantially protected from the access of dust.

But when that known press is in operation it has been found that it is not possible to achieve complete protection of the ram shanks against dust, which shanks are covered with a lubricant film, since, as the rams move rotationally, they carry out different up and down movements from one another, and as a result there is non-uniform deformation of the intermediate walls in which the ram shanks are situated and to which they are secured. Especially the intermediate walls are subjected to very strong dragging forces in the region between the rams, which succeed one another in close succession in the circumferential direction of the mould table, and undergo considerable stress, because the spacing between neighbouring rams in the region of their fastening zones is changed during the moulding operation when these fastening zones of neighbouring rams get into different height positions. These rapidly recurring dragging forces in the circumferential direction quickly lead to fatigue of the elastomer of which the intermediate walls are made, and cause cracks in the intermediate wall. The ram shanks are then no longer securely arranged in the holes associated with them in the intermediate wall, and instead become pulled out of the latter, and the intermediate wall tears at the same time and becomes unusable.

SUMMARY OF THE INVENTION

The invention has as its object to improve the sealing arrangement in a rotary tablet press of the type described above so that it ensures complete antidust protection for the vertically moving ram shanks, it can be manufactured and assembled with low cost, and it can also be incorporated subsequently in existing rotary tablet presses.

This object is achieved by the invention in which a flexible member in the form of an annular intermediate wall has in each position corresponding to a ram an aperture formed for the ram head to pass through, and has an elastic sleeve with one end thereof connected in an airtight manner to the aperture edge of the intermediate wall and other end secured in airtight manner on the ram shank to expose the ram head to a corresponding mould.

This construction has the advantage that it allows considerable stretch and compression in the region of the intermediate wall between adjacent rams, and the stretching and compression are taken up by the change of shape in the deformable sleeves and not only by relying the elasticity of the intermediate wall material. If the region of the intermediate wall between neighbouring rams takes up an oblique position, neighbouring apertures in the intermediate wall can move along the surface of the ram shanks associated with them to reduce the stress. Since the sleeves are secured between the intermediate wall and the rams, and surround the rams closely, it does not cause any problem to the required air-tightness, so that the dust which develops when the press is in operation cannot get to the ram shanks situated beyond the intermediate wall.

It is especially appropriate if the sleeves have at their edge which is to be secured to the ram shank a bead which engages in an encircling groove provided on the ram shank. As a result a dust-tight connection is created which is also sufficiently elastic not to oppose a lateral movement of the opposite edge of the sleeve.

The sleeve is expediently made in one piece with the intermediate wall, and extends from the latter axially in the direction towards the mould. Intermediate wall and sleeve are made advantageously of an elastomer which has no taste or smell, such as is conventionally used in apparatus used for the processing of foodstuffs and medicaments.

Arranging the sleeves to project beyond the plane of the intermediate wall allows unhindered lateral movement of the one end of the sleeve which is connected to the edge of the intermediate wall aperture, so that the elastic material of which the intermediate wall consists is not over-stressed. In the case of the intermediate wall for sealing the upper rams, the sleeves which here project downwards beyond the intermediate wall also have the advantage that their annular space formed between the ram shank and the sleeve wall surrounding said shank can collect lubricant and other impurities or unwanted substances which reach the upper surface of the intermediate wall from the ram guides. This is advantageous especially when the annular intermediate wall is divided radially for easier assembly and disassembly, and joined again at this place by strips of buttons or studs or the like. Lubricant passing through this seam zone is then easily caught in a sleeve situated therebelow and expediently arranged in the vicinity of such an assembly seam.

In order that the sleeves arranged at the intermediate wall can satisfactorily cope with the tugging and compressing phenomena which occur in the circumferential direction and in the vertical direction as the press rotates, without being stressed to much in their material, it is advantageous if the sleeve is constructed as a bellows. The sleeves surrounding the ram shanks then have sufficient length for accommodating axial movements of neighbouring rams.

In order to ensure a good sealing of the ram guides from the exterior, the outer edge of the intermediate wall can merge into an elastic substantially axially disposed annular wall which is constructed as a bellows and is secured with its free edge to the mould table in airtight manner. Constructing the annular wall as a bellows allows different parts of the intermediate wall to carry out considerable movements differing from one another over the circumference, without thereby having the material of which the intermediate wall is made being subjected to high stress. But above all the intermediate wall can also be connected in gas-tight manner to the ram guide part of the mould, so that it is no longer necessary to provide in the region of the moulding stations for the upper rams a special sealing wall along which the outer edge of the intermediate wall slide and where an airtight connection could not be achieved in the case of the known apparatus.

It is particularly advantageous if the inner edge of the intermediate wall, and the free edge of the annular wall, are clamped fast to the mould table with clamping bands which may also be provided with rapid-action fasteners. As a result, the intermediate wall can be removed and replaced very quickly, for it being possible to strip the sleeves easily off the ram shanks.

In order to achieve a certain stability in the shape of the sealing intermediate walls despite great mobility, the annular wall can be formed of two bellows which are connected to one another by a cylindrical wall portion.

Further features and advantages of the invention are shown in the following description and the drawings, in which a preferred constructional form of the invention is described in more detail by way of example.

DETAILED DESCRIPTION OF A PREFERRED EMBODIMENT

Figure 1:
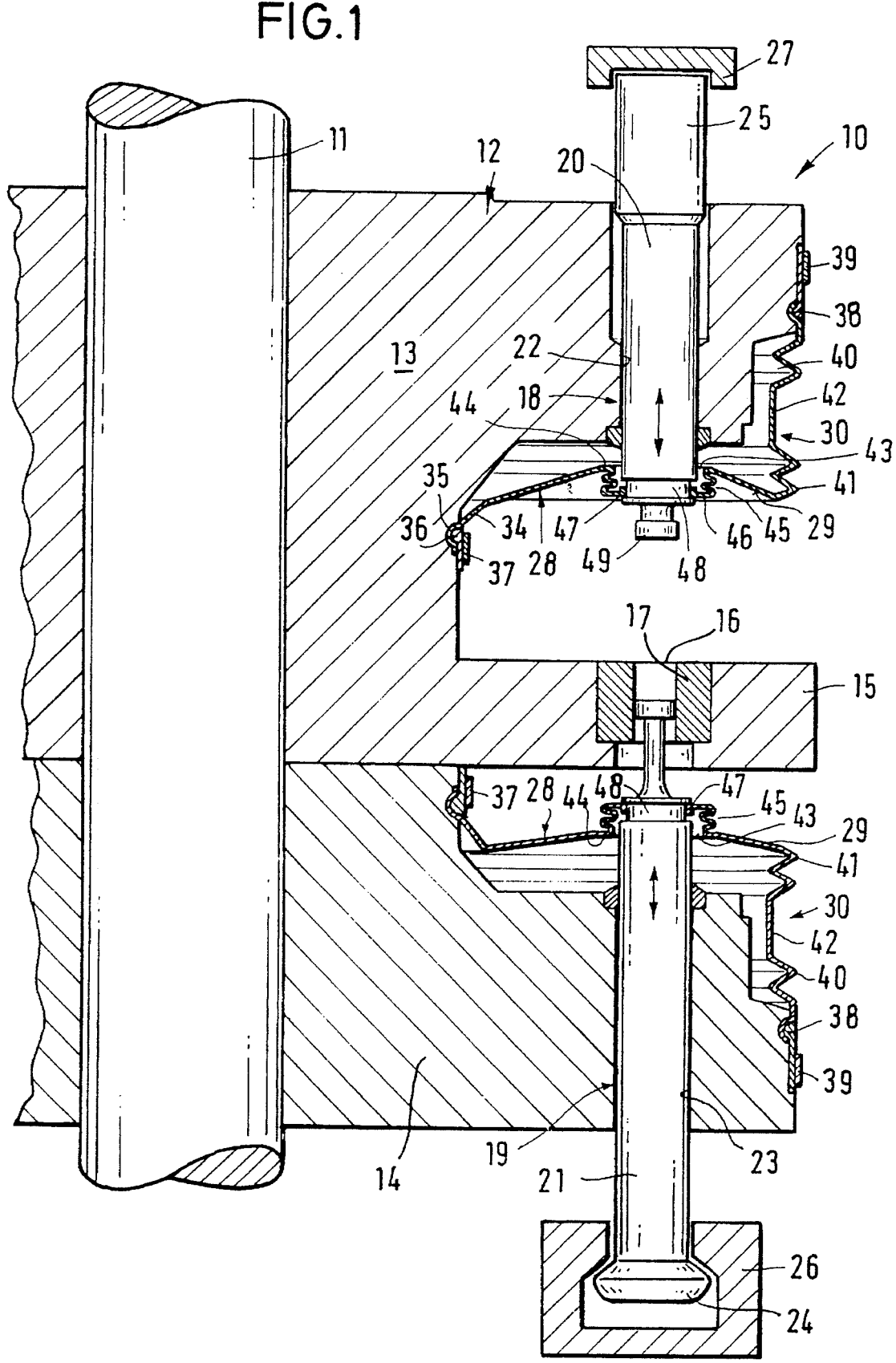
FIG. 1 shows a rotary tablet press according to the invention, in a vertical part-section through the mould table.

The rotary tablet press 10 shown in FIG. 1 has a mould table 12 which rotates horizontally around a main shaft 11. The table 12 has an upper ram guide ring 13 and a lower ram guide ring 14, these being connected to be integral in rotation with one another. At its lower edge the upper ram guide ring 13 comprises the mould shelf 15 in which the mould holes 16 are situated in a circle in which holes the moulds 17 are arranged. Co-axially with the moulds 17 there are arranged in the mould table 12 upper rams 18 in the upper ram guide ring 13 and lower rams 19 in the lower ram guide ring 14, the shanks 20 and 21 respectively of these rams being guided slidably in ram guides 22,23 respectively.

Each mould 17 has an upper ram 18 and a lower ram 19 associated with it, their foot ends 24 and head ends 25 respectively sliding in slide rails 26 and 27 which control the upward and downward movement of the rams 18 and 19 when the press rotates.

It will be seen from FIG. 1 that intermediate walls 28 are arranged between the upper ram guide 22 and the mould shelf 15 on the one hand and the other between the lower ram guide 23 and the mould shelf 15 on the other hand. Since these two intermediate walls are of substantially identical construction to one another, only the intermediate wall 28 between the upper ram guide 22 and the mould shelf 15 will be described in the following.

The intermediate wall 28, which is made of a medically unobjectionable elastomer, has a substantially horizontally arranged annular base portion 29 and a substantially axially disposed annular wall 30 which is made in one piece with the base portion 29. The entire intermediate wall 28 is radially divided both in the base portion 29 and also in the region of its annular wall 30, and connected again at the mutually overlapping edges 31 and 32 by press studs 33. As a result the intermediate wall 28 can easily be opened and closed again (FIG. 2).

FIG. 1 shows that the inner edge 34 of the intermediate wall 28 has an encircling outwardly projecting bead 35 which engages in a groove 36 of semicircular cross-section in the mould table 12 and is secured there with a clamping band 37 using a rapid-action fastener not shown in detail. In the same way the upper free edge 38 of the annular wall 30 is clamped fast with a clamping band 39 on the outer circumference of the mould table 12.

The annular wall 30 comprises two bellows 40 and 41 which are situated axially one above the other and connected to one another by a cylindrical wall portion 42. The bellows 40 and 41 are made, as is the cylindrical wall portion 42 also, of an elastomer, for example rubber or an elastomeric synthetic plastic material, and are made in one piece with the base portion 29 of the intermediate wall 28.

Figure 2:
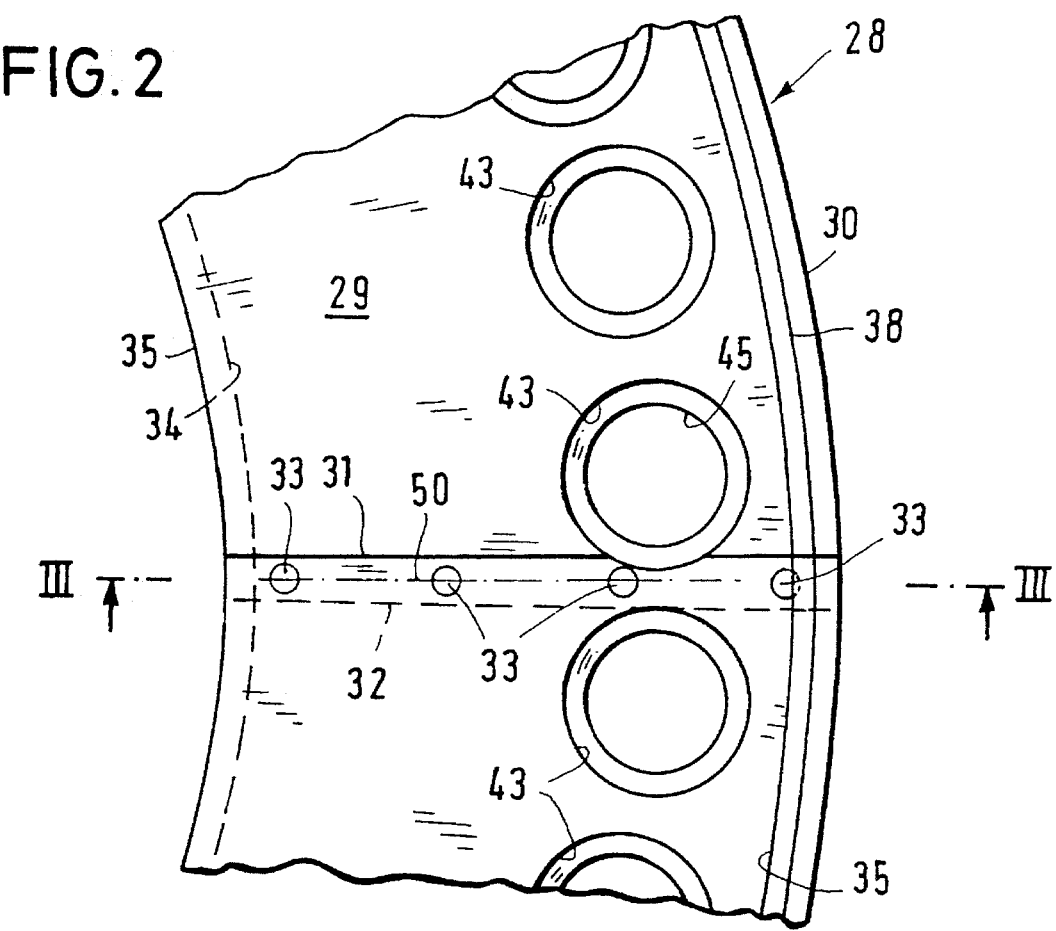
FIG. 2 shows the intermediate wall for sealing the ram guides, in a partial plan view on a larger scale.
Figure 3:
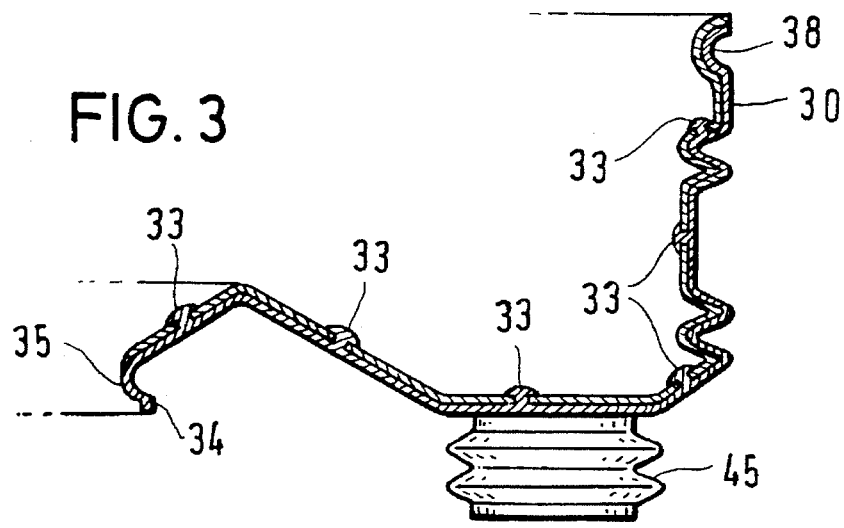
FIG. 3 is a cross-section view through the seam zone of the intermediate wall according to FIG. 2.

FIGS. 1 and 2 show that the flexible annular intermediate wall 28 has in the region of each ram 18 a circular aperture 43 which surrounds the ram shank 20 with spacing therefrom. Formed on to each aperture edge 44 is a sleeve 45, which is constructed as a bellows, is made in one piece with the base portion 29 of the intermediate wall 28, and extends from the intermediate wall 28 axially in the direction towards the mould 17. The sleeve 45 has at its free edge 46 a bead 47 which under preload extends into an encircling groove 48 which is situated on the lower end of the ram shank 20, which end is provided with the ram head 49.

The sleeves 45, constructed as bellows and, like the intermediate wall 28 and its annular wall 30, made of an elastomer, can stretch in the axial direction of the ram shanks 20, but can also with their upper edge carry out radial movements and movements directed in the circumferential direction of the intermediate wall 28. They can also follow an inclined position of the intermediate wall 28 in the circumferential direction, in which cases the radially adjoining surfaces of the intermediate wall 28, which in fact are also connected externally to the annular wall 30 constructed as a bellows, do not present any resistance to these movements. Thus no considerable, detrimental stresses result in the intermediate wall 28 even when the press is operating at a very high rotational speed and the upper and lower rams are carrying out their rapidly ascending and descending movements during the rotation. Since the sleeves are not stressed in the region of their free edges 46, they can perform their sealing task satisfactorily here. The inner edge 34 and the free outer edge 38 of the intermediate wall are also hardly stressed during the upward and downward movement of the rams, so that here again a satisfactorily airtight fit is ensured.

FIG. 2 shows that the sleeves 45 of two rams in succession to each other circumferentially are arranged directly adjacent the connection seam 50 which is formed by the mutually overlapping radial edges 31 and 32 of the intermediate wall 28. As a result it is possible for lubricant from the ram shanks 20 of the upper rams 18, getting on to the upper surface of the intermediate wall 28 and passing downwards through the joint between the mutually overlapping edges 31 and 32, to flow into the sleeve 45 which is adjacent to the lower edge 32 of the connecting seam 50. These unwanted substances, passing through the connecting seam, in this way are retained and rendered harmless.

The invention is not limited to the constructional example which is illustrated and described, and instead a plurality of modifications and additions are possible without departing from the scope of the invention. For example one or more folds could also be arranged in the horizontal portion of the intermediate wall 28. It is also possible to give the sleeve a cylindrical or frustoconical form, and to secure it to the ram shank in a somewhat different way. Moreover the inner edge and the outer edge of the sealing sleeve may also be secured adhesively, or in some other way, to the mould, the essential being simply that the ram guide i.e. the space in which the rams move is completely protected against dust.

It is also possible to construct the intermediate walls as non-divided annular sealing walls, if a special configuration of the mould table allows the mounting of such non-divided sealing walls. When divided sealing walls are used, the connecting seam may also be made with a sliding clasp fastener or a velcro fastener.

What is claimed is:

1. A rotary tablet press comprising:

a rotatable table with means for carrying a plurality of moulds;

a plurality of pairs of upper and lower rams co-axially supported by said rotatable table, each said pair of upper and lower rams being arranged to be movable relative to one of said plurality of moulds to press material within said one mould;

a first flexible wall member being secured between said rotatable table and each upper ram of said plurality of pairs of upper and lower rams and a second flexible wall member being secured between said rotatable table and each lower ram of said plurality of pairs of upper and lower rams so as to form an airtight seal between a shank portion of each said ram and said mould carrying means; and wherein said airtight seal is formed by an elastic sleeve surrounding said shank portion of each ram and connecting said ram to its respective flexible member.

2. A press according to claim 1, wherein said elastic sleeve comprises an end which is secured to said shank portion and a bead at said end which engages into an encircling groove formed on said shank portion.

3. A press according to claim 1, wherein said elastic sleeve is made in one piece with said respective flexible member and extends from the latter axially towards said respective mould.

4. A press according to claim 1, wherein said elastic sleeve is constructed as a bellows.

5. A press according to claim 1, wherein an outer edge of at least one of said first and second flexible members is constructed as a bellows and is secured in an airtight manner to the rotatable table.

6. A press according to claim 1, wherein an inner edge of at least one of said first and second flexible members is clamped fast by clamping means to said rotatable table.

7. A press according to claim 1, wherein each of said first and second flexible members has an annular portion formed by two bellows which are connected to each other by a cylindrical portion.

8. A press according to claim 1, wherein each said first and second flexible members has a connectable seam and at least one said elastic sleeve arranged adjacent said seam.

* * * * *